United States Patent [19]

Zaun et al.

[11] 3,802,019
[45] Apr. 9, 1974

[54] ROOT CROP CLEANING AND CONVEYING MECHANISM

[75] Inventors: Richard David Zaun; Richard Wayne Hook, both of Des Moines, Iowa

[73] Assignee: Dure & Company, Moline, Ill.

[22] Filed: Feb. 15, 1973

[21] Appl. No.: 332,562

Related U.S. Application Data

[63] Continuation of Ser. No. 209,117, Dec. 17, 1971, abandoned.

[52] U.S. Cl............................ 15/3.11, 209/107
[51] Int. Cl........................................ A23n 15/00
[58] Field of Search............. 15/3.1, 3.11; 209/107; 171/10, 12, 18

[56] References Cited
UNITED STATES PATENTS
2,624,458  1/1953  Moinau.......................... 15/3.11 X
2,690,576  10/1954  Dreesman........................ 15/3.2 X
3,629,890  12/1971  Harris............................ 15/3.11

Primary Examiner—Edward L. Roberts

[57] ABSTRACT

A root crop harvester utilizes a cross auger to move the harvested roots to a vertical auger which elevates the roots to a deposit area. The cross auger includes an elongated helical auger and a trough formed by a plurality of elongated grab rolls which are positioned closely adjacent to the auger flighting and extend parallel to the helical auger. The grab rolls are driven to provide a scrubbing action on the roots, and the close relationship between the auger flighting and the grab rolls keeps the grab rolls free from soil buildup even in extreme harvest conditions.

9 Claims, 3 Drawing Figures

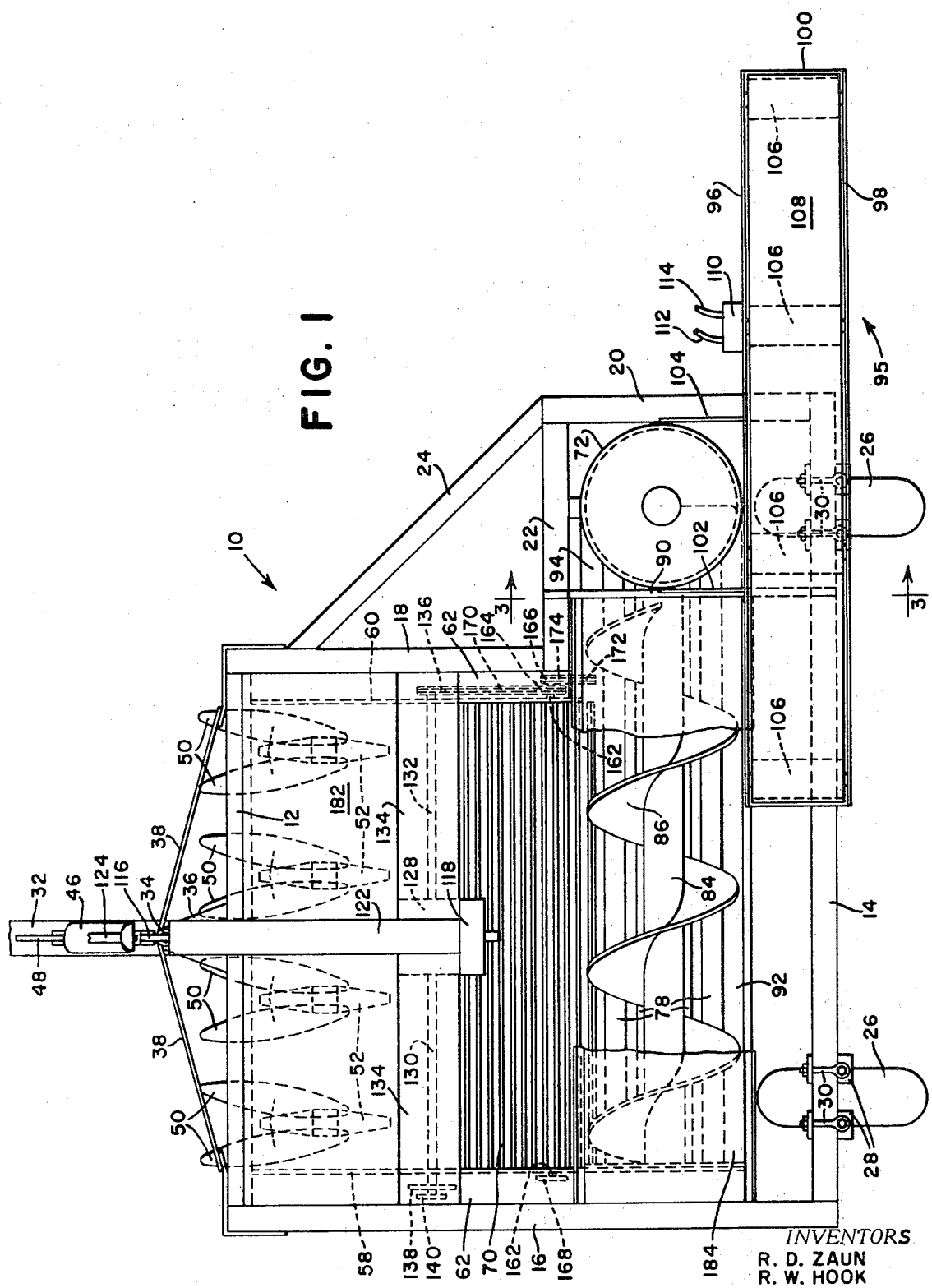

PATENTED APR 9 1974

INVENTORS
R. D. ZAUN
R. W. HOOK

BY R L Hollister

ATTORNEY 3,802,019

ROOT CROP CLEANING AND CONVEYING MECHANISM

CROSS REFERENCE TO RELATED APPLICATIONS

This application is a continuation of application Ser. No. 209,117 filed Dec. 17, 1971 and now abandoned and discloses subject matter common to copending U.S. application Ser. No. 209,124, filed concurrently with application Ser. No. 209,117.

BACKGROUND OF THE INVENTION

The present invention relates generally to apparatus for cleaning root crops and more particularly relates to a self-cleansing cleaner and conveyor for root crops. Although the invention relates generally to apparatus for cleaning and conveying root crops, the following background of the invention, summary of the invention and description of the invention will refer to apparatus for cleaning and conveying sugar beets, but this is merely for the purpose of providing a specific disclosure and is not intended to in anyway limit the invention.

When root crops such as sugar beets are harvested, a large quantity of dirt may cling to the surface of the beets and materially increase the weight and displacement of the beets. To remove the dirt and other foreign materials, it has been customary to pass the beets over roll-type cleaners which employ a series of parallel rollers or grab rolls which tumble the beet and provide a scrubbing action thereon and which are spaced sufficiently far apart to permit passage of loosened soil, small rocks, and other foreign material. Many of the roll-type mechanisms have a helical flight mounted on and fixed to the rollers which serve to convey the beets along the grab rolls and deposit the same over one end of the grab rolls. Roll-type cleaning mechanisms have been successful in removing both dry and wet dirt and other foreign material. However, a definite problem with this type of cleaning mechanism has been mud buildup on the rolls between the helical flighting. The mud would pack on the rolls between the helical flighting with the result that the flighting would become ineffective to convey the beets. The mud buildup would also cause the grab rolls to be much too aggressive and do considerable damage by crushing beets through the rolls.

SUMMARY OF THE INVENTION

The principal object of the present invention is to provide a self-cleansing beet cleaner and conveyor.

A more specific object of the present invention is to provide a beet cleaner and conveyor which includes a plurality of elongated grab rolls forming a trough and in which an auger is mounted for rotation within the trough and has its helical flighting in close relationship with the grab rolls whereby the auger will convey the beets along the trough formed by the grab rolls and will also prevent soil buildup on the grab rolls.

Yet another object of the present invention is to provide a self-cleansing beet cleaning and conveying mechanism which includes a plurality of elongated grab rolls forming a trough about an auger which conveys beets deposited on the grab rolls to one end of the grab rolls, in which the grab rolls are spaced closely adjacent to the helical flighting of the auger and extend parallel to the axis of rotation of the auger, and in which the grab rolls are driven, whereby the grab rolls will provide a scrubbing action on the beets to remove any foreign material which may be clinging thereto, and the close relationship between the helical flighting of the auger and the grab rolls will prevent any soil buildup on the grab rolls.

The above objects and additional objects and advantages of the present invention will become apparent, along with the details of construction of a preferred embodiment of the invention, to those skilled in the art from a reading of the following detailed description when taken in conjunction with the accompanying drawings.

BRIEF DESCRIPTION OF THE DRAWINGS

In the drawings:

FIG. 1 is a top elevational view of a beet harvester embodying the cleaning and conveying mechanism according to the present invention;

DESCRIPTION OF THE PREFERRED EMBODIMENT

Figure 3:
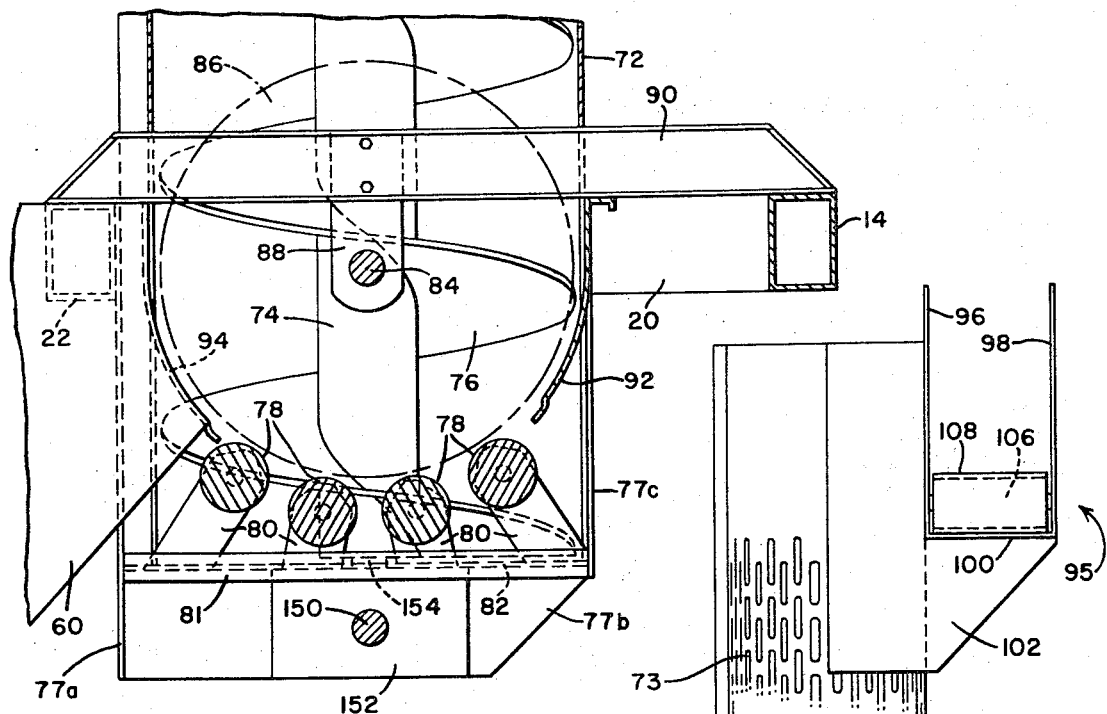

In the following description, the beet cleaning and conveying mechanism according to the present invention is illustrated, for the purpose of setting forth the best mode contemplated of carrying out the invention, as part of a beet harvester, but it should be understood that the same or a similar beet cleaning and conveying mechanism can be used in other applications. For example, a similar cleaning and conveying mechanism could form part of a beet piler.

Referring now to the drawings, the beet harvester illustrated therein is indicated generally by the numeral 10 and includes a front frame member 12, a rear frame member 14, a left side frame member 16, front and rear laterally offset right side frame members 18 and 20, an intermediate frame member 22 interconnecting the right side frame members, and a diagonal brace member 24 extending between the front and rear right side frame members.

The rear portion of the main frame is supported by a pair of wheels 26 journaled on the lower ends of fork members 28 which have their upper ends secured to the rear frame member 14. Each of the fork members 28 is releasably secured to the rear frame member 14 by a pair of clamp assemblies 30 so that, by loosening the clamp assemblies, the fork members can be moved along the rear frame member 14 and the wheels positioned to conform to various row spacings.

The forward end of the main frame is supported by a forwardly extending hitch 32 which is adapted to be connected to a tractor drawbar (undisclosed). The hitch 32 is connected to the frame for both vertical and lateral movement. To this end, a vertical pivot shaft 34 is supported on the front frame member 12 by a pair of vertically spaced plates 36 secured to the front frame member 12 and by support members 38 which extend diagonally between the ends of the front frame member 12 and the forward ends of the plates 36. Pivot blocks 40 and 42 are secured to the upper and lower ends, respectively, of the pivot shaft 34 and the rear end of the hitch 32 is pivotally connected to the pivot block 42 for vertical movement about a pivot pin 44. The rod end of a hydraulic cylinder 46 is pivotally connected to the pivot block 40 and the anchor end of the cylinder 46 is pivotally connected to a bracket 48 integral with the hitch 32 so that, by extending and retracting the cylinder 46, the forward end of the main frame is raised and lowered. Lateral movement of the hitch 32 about the axis of the pivot shaft 34 will be under the control of a conventional row finder unit and hydraulic cylinder which are undisclosed as they form no part of the present invention.

A pair of support plates 58 and 60 depend from the left- and right-hand sides, respectively, of the main frame and each is spaced inwardly of its respective frame bar. Each of the supporting plates 58 and 60 is provided with an upper horizontal flange portion 62 which projects toward the respective side frame member and is secured thereto in any suitable manner.

A plurality of digger wheel assemblies are secured to the front frame member 12 in spaced relation to each other and each includes a pair of lifter wheels 50 and a paddle 52. Each pair of lifter wheels is mounted on the lower end of a standard 54 which has its upper end secured to the front frame member 12 by releasable clamps which permit the wheel assemblies to be adjusted along the front frame member to conform to various row spacings.

A non-circular cross shaft 56 extends between the support plates 58 and 60 and is rotatably supported on the support plates by suitable bearings. The paddles 52 are mounted on the cross shaft 56 to be driven thereby and can be adjusted along the length of the cross shaft 56 to conform to various row spacings. The manner in which the cross shaft 56 is driven will be described hereinafter along with the description of the drive train for other components of the harvester.

A conveyor is carried by the support plates 58 and 60 directly behind the digger wheel assemblies and includes upper and lower transverse shafts 64 and 66 which extend between and are journaled on the support plates 58 and 60. Sprocket wheels 68 are mounted on the shafts 64 and 66 and serve to mount and drive a potato chain 70 which receives beets from the digger wheel assemblies and conveys the same upwardly and rearwardly.

A vertical auger conveyor is supported by the main frame between the rear frame member 14 and the intermediate frame member 22 and includes a cylindrical housing 72 which is provided with a plurality of openings 73 forming a cleaning grate. The auger housing is closed at both ends, but has a laterally directed opening adjacent its lower end and a rearwardly directed opening adjacent its upper end. An auger including a core 74 and a helical flighting 76 secured to the core is journaled within the housing 72 to elevate beets from the lower opening in the housing to the upper opening in the housing. Although not illustrated in the drawings or described therein, the vertical auger is preferably of the type illustrated, described and claimed in copending application Ser. No. 209,116, filed concurrently herewith. Protective plates 77a, 77b and 77c are secured to the lower end of the auger housing and the main frame at the front, side and rear, respectively, of the auger housing to help secure the auger housing to the main frame and to also provide protection for the lower end of the auger housing. The precise manner in which the vertical auger conveyor is secured to the main frame forms no part of the present invention since numerous alternatives will be apparent to those skilled in the art.

A plurality of elongated grab rolls 78 each have one end journaled in the support plate 58 and an opposite end journaled on a bracket 80 carried on a mounting bar 81 secured to the bottom wall 82 of the housing 72. A cross auger including a central core 84 and a helical flighting 86 has one end journaled in the support plate 58 above the grab rolls 78 and its opposite end journaled in a bracket 88 depending from a cross bar 90 extending between the frame members 14 and 22. The grab rolls extend parallel to the axis of the cross auger and to each other, are positioned closely adjacent the helical flighting 86 of the cross auger and form a trough for the cross auger. As will be appreciated by those skilled in the art, the grab rolls can be smooth, fluted, or any combination of smooth and fluted.

A curved shield 92 directly to the rear of the cross auger extends between the support plate 58 and the housing 72 in close proximity to the rear of the cross auger to form a continuaton of the trough for the cross auger. The right-hand ends of the grab rolls and cross auger extend beyond the right-hand side of the potato chain 70 and an additional curved shield 94 extends between the support plate 60 on the right side of the main frame to the housing 72 in close proximity to the front of the cross auger to form a continuation of the trough therefor.

An additional conveyor indicated generally at 95 is mounted on the upper end and to the rear of the vertical auger in beet-receiving relationship to the opening provided in the upper end of the auger and includes a pair of side walls 96 and 98 and a bottom wall 100. A pair of plates 102 and 104 are secured to the housing 72 of the vertical auger and each have a section projecting under the bottom wall 100 of the additional conveyor to provide support therefor. The plates 102 and 104 also provide a guide for the beets between the vertical auger conveyor and the additional conveyor. A plurality of rollers 106 are rotatably mounted between the side walls 96 and 98 and an endless flexible element 108 in the form of a belt or potato chain is trained about the rollers to deliver beets laterally outwardly for deposit into a truck or trailer moving alongside of the harvester. A hydraulic motor 110 is mounted on the side wall 96 and operatively connected to one of the rollers 106 to provide the power to drive the endless flexible element 108. A pair of hydraulic lines 112 and 114 extend from the hydraulic motor 110 and are adapted to be connected to the hydraulic system of the tractor to which the harvester is coupled. The conveyor 295 extends laterally inwardly as well as laterally outwardly from the vertical auger conveyor, but this feature is unimportant as far as the present invention is concerned. For an understanding of why the upper conveyor 295 also projects inwardly from the vertical auger conveyor, reference can be had to copending U. S. application Ser. No. 209,123, filed concurrently herewith.

The drive train for the movable components of the harvester includes a main drive shaft extending from a central portion of the main frame to the power take-off of the tractor. The main drive line includes a first portion 116 which has its rear end journaled in a transfer box 118 and its forward end journaled on a support member 120 secured to the forward frame member 12.

Figure 2:
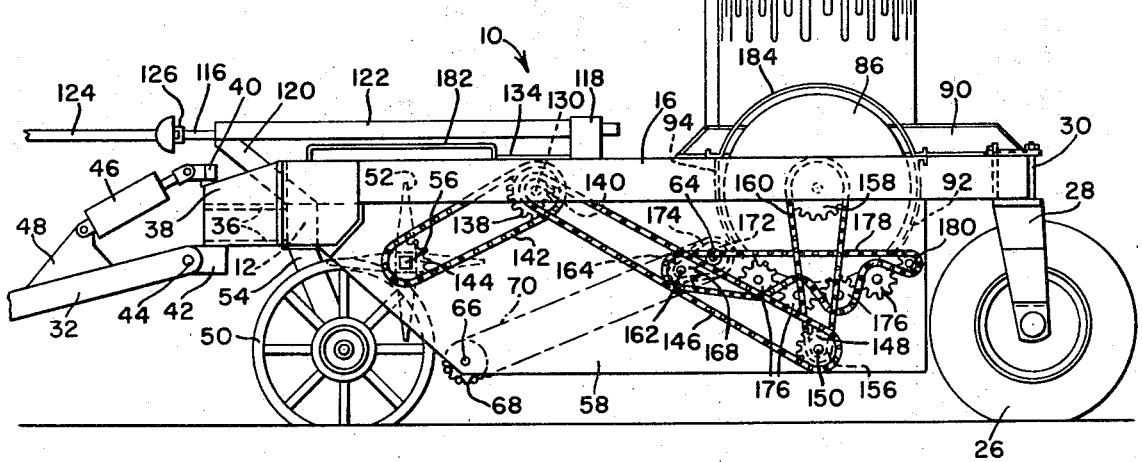
FIG. 2 is a side elevational view of the beet harvester illustrated in FIG. 1; and, FIG. 3 is a sectional view taken substantially along the line 3—3 of FIG. 1.

A guard 122 covers the first portion 116 of the main drive line. A second portion 124 of the main drive line is connected to the first portion 116 by a U-joint 126 and extends forwardly to the tractor. A chain in the transfer box 118 transfers power from the drive shaft 116 to a gear box 128 which drives oppositely extending shafts 130 and 132 in opposite directions. The shaft 130 is driven in a counterclockwise direction when viewed from the left as illustrated in FIG. 2 and the shaft 132 is driven in a clockwise direction when viewed from the left. The shafts 130 and 132 extend through the support plates 58 and 60, and are covered by shields 134. A sprocket wheel 136 is mounted on the outer end of the shaft 132 and a pair of sprocket wheels 138 and 140 are mounted on the outer end of the shaft 130. A drive chain 142 is trained about the sprocket wheel 138 and a sprocket wheel 144 on the left-hand end of the cross shaft 56 for the paddles 52 so that the paddles 52 are driven in a counterclockwise direction as viewed in FIG. 2.

A chain 146 is trained about the sprocket wheel 140 and extends rearwardly and downwardly to a sprocket wheel 148 mounted on the left-hand end of a drive shaft 150 which has its left-hand end journaled in a lower rear portion of the support plate 58 and extends laterally across the implement to a right-angle gear box 152 which is mounted on the bottom wall of the housing 72 for the vertical auger conveyor and which has an output shaft 154 connected to the core 74 of the vertical auger. An additional sprocket wheel 156 on the drive shaft 150 is interconnected with a sprocket wheel 158 for the cross auger by a chain 160. By having the vertical auger and cross auger driven from the same shaft 150, they remain properly timed for efficient transfer of beets from one auger to the other.

An additional cross shaft 162 extends between the upper and lower flights of the potato chain 70, has its ends journaled in the support plates 58 and 60, has a pair of sprocket wheels 164 and 166 mounted on its right-hand end, and has a sprocket wheel 168 mounted on its left-hand end. A drive chain 170 is trained about the sprocket wheels 136 and 164 on the shafts 132 and 162, respectively, for driving the shaft 162. A sprocket wheel 172 on the end of the upper shaft 64 for the potato chain 70 is interconnected with the sprocket wheel 166 on the shaft 162 by a chain 174 to drive the potato chain 170.

Sprocket wheels 176 are mounted on the left-hand ends of the grab rolls 78 and are interconnected with the sprocket wheel 168 on the left-hand end of the shaft 162 by a chain 178. The lower flight of the chain 178 passes alternately under and over alternate sprocket wheels 176 to drive adjacent grab rolls in opposite directions, and at its end remote from the sprocket wheel 168 passes about an idler sprocket wheel 180. As an alternate arrangement, the grab rolls could all be driven in the same direction as the auger.

To cover some of the moving parts and add to the appearance of the beet harvester, a cover plate 182 is mounted on the forward portion of the main frame over the digger wheel assemblies, and a cover 184 is mounted over the cross auger.

The operation of the beet harvester is as follows. The tractor operator will engage the tractor power take-off to drive the main drive shafts 124 and 116 to provide power to the various driven components of the harvester and will also adjust a hydraulic valve on the tractor to interconnect the conventional source of fluid pressure on the tractor with the hydraulic motor 110 for the upper conveyor 95. The operator will also make the necessary manipulations of the hydraulic system on the tractor to retract the cylinder 46 to lower the forward end of the main frame so that the lifter wheels 50 will extend into the ground to the proper position for removing beets. As the harvester is moved forward, the lifter wheels 50 will pinch and raise the beets and the paddles 52 will contact and throw the beets rearwardly onto the potato chain 70. The potato chain 70 conveys the beets rearwardly and deposits them on the grab rolls 78.

The rotation of the grab rolls provides a scrubbing action on the beets to clean foreign material therefrom. The foreign material removed from the beets is deposited through the openings between the grab rolls. As the beets are being cleaned by the grab rolls, they are also moved laterally toward the vertical auger conveyor by the flighting 86 on the cross auger. If the beet harvester is working in muddy conditions so that a relatively large amount of mud remains on the beets when they are transferred to the grab rolls, the mud will have a tendency to pack onto the grab rolls which will make the grab rolls much too aggressive and could easily crush the beets between the grab rolls. However, this condition is prevented by the close proximity of the grab rolls to the flighting 86 of the cross auger since the flighting 86, as it moves along the grab rolls, will remove any excess mud which is packed onto the grab rolls.

As the beets are transferred from the cross auger conveyor to the vertical auger conveyor, the flighting 76 of the vertical auger conveyor raises the beets to a point where they are transferred through the opening in the rear of the upper end of the housing 72 and onto the belt 108 of the upper conveyor 95. The belt 108 transfers the beets outwardly and deposits the same into a truck or trailer moving alongside the harvester.

From the foregoing description of the preferred embodiment of the invention, it can be seen that the present invention provides apparatus for efficiently cleaning and conveying beets, and which will prevent soil buildup on the cleaning elements in the most extreme harvesting conditions.

Having thus described a single preferred embodiment of the invention, various modifications within the spirit and scope of the invention will become apparent to those skilled in the art and can be made without departing from the underlying principles of the invention. Therefore, the invention should not be limited by the specific illustration and description, but only by the following claims.

We claim:

1. Root crop cleaning and conveying mechanism comprising: a supporting framework; an elongated helical auger rotatably mounted on the framework; a plurality of pairs of elongated grab rolls extending parallel to the helical auger and rotatably mounted on the framework to form trough means for the auger; and drive means associated with the auger and grab rolls for rotating the auger and grab rolls.

2. Root crop cleaning and conveying mechanism as set forth in claim 1 wherein each of the grab rolls is closely adjacent the helical auger, the grab rolls of each pair of adjacent grab rolls are positioned equal distances from each other, and the grab rolls are positioned equal distances from the axis of rotation of the helical auger.

3. Root crop cleaning and conveying mechanism as set forth in claim 2 wherein the drive means includes means for rotating adjacent grab rolls in opposite directions.

4. Root crop cleaning and conveying mechanism comprising: an open bottom supporting framework; an elongated helical auger rotatably mounted on the framework; a plurality of pairs of elongated grab rolls rotatably mounted on the framework in close proximity to the auger and extending parallel to the axis of rotation of the auger, and drive means associated with the auger and grab rolls for driving the auger and grab rolls.

5. The root crop cleaning and conveying mechanism set forth in claim 4 wherein the drive means associated with the auger and grab rolls includes means for driving adjacent grab rolls in opposite directions.

6. The root crop cleaning and conveying mechanism set forth in claim 5 wherein the grab rolls are spaced equal distances from each other and are positioned beneath the auger to form a trough for the auger.

7. Root crop cleaning and conveying mechanism comprising: a supporting framework; an elongated helical auger mounted on the framework for rotation about a fixed axis; a plurality of pairs of elongated grab rolls extending generally parallel to the auger and mounted on the framework for rotation about axes spaced equal distances from the axis of rotation of the auger; each of the grab rolls being positioned closely adjacent the auger, and drive means associated with the auger and grab rolls.

8. Root crop cleaning and conveying mechanism comprising: a supporting framework; a plurality of pairs of closely spaced and parallel grab rolls rotatably mounted on the framework and forming a trough; means associated with the grab rolls for rotating the grab rolls in opposite directions, whereby foreign material clinging to roots deposed in the trough will be separated from the roots by the scrubbing action between the grab rolls and roots; an elongated helical auger including a central core and a helical flight encircling and secured to the core positioned within the trough and rotatably mounted on the framework; and means associated with the auger for rotating the auger, whereby roots deposed within the trough will be advanced along the trough and deposited over one end of the trough.

9. The root crop cleaning and conveying mechanism set forth in claim 8 wherein the grab rolls are spaced equal distances from the axis of rotation of the auger and closely adjacent the periphery of the helical flight whereby the helical flight will remove any foreign material clinging to the grab rolls.

* * * * *

UNITED STATES PATENT OFFICE
CERTIFICATE OF CORRECTION

Patent No. 3,802,019             Dated   9 April 1974

Inventor(s)  Richard David Zaun, Richard Wayne Hook

It is certified that error appears in the above-identified patent and that said Letters Patent are hereby corrected as shown below:

On the Title Page, change Assignee from "Dure & Company" to
-- Deere & Company --.

Signed and sealed this 17th day of September 1974.

(SEAL)
Attest:

McCOY M. GIBSON JR.                C. MARSHALL DANN
Attesting Officer                  Commissioner of Patents